United States Patent
Canepa et al.

(10) Patent No.: US 10,229,052 B2
(45) Date of Patent: Mar. 12, 2019

(54) REVERSE MAP LOGGING IN PHYSICAL MEDIA

(71) Applicant: Seagate Technology, LLC, Cupertino, CA (US)

(72) Inventors: Timothy Canepa, Los Gatos, CA (US); Ryan J. Goss, Prior Lake, MN (US); Stephen Hanna, Fort Collins, CO (US)

(73) Assignee: Seagate Technology LLC, Cupertino, CA (US)

( * ) Notice: Subject to any disclaimer, the term of this patent is extended or adjusted under 35 U.S.C. 154(b) by 93 days.

(21) Appl. No.: 15/609,198

(22) Filed: May 31, 2017

(65) Prior Publication Data

US 2018/0349266 A1    Dec. 6, 2018

(51) Int. Cl.
*G06F 12/02* (2006.01)
*G06F 3/06* (2006.01)

(52) U.S. Cl.
CPC .......... *G06F 12/0246* (2013.01); *G06F 3/061* (2013.01); *G06F 3/065* (2013.01); *G06F 3/0655* (2013.01); *G06F 3/0688* (2013.01); *G06F 2212/7201* (2013.01)

(58) Field of Classification Search
CPC ............. G06F 12/0246; G06F 3/061; G06F 2212/7201; G06F 2212/7205; G06F 3/064; G06F 2212/702; G06F 3/0608; G06F 3/0655; G06F 3/0688; G06F 3/065

See application file for complete search history.

(56) References Cited

U.S. PATENT DOCUMENTS

| | | | |
|---|---|---|---|
| 7,844,772 B2 * | 11/2010 | Moon ................. | G06F 12/0246 711/103 |
| 8,001,450 B2 | 8/2011 | Onishi et al. | |
| 8,255,617 B2 | 8/2012 | Goss et al. | |
| 8,364,886 B2 | 1/2013 | Goss | |
| 8,914,597 B2 | 12/2014 | Benhase et al. | |
| 9,201,728 B2 | 12/2015 | Patapoutian et al. | |
| 9,430,329 B2 | 8/2016 | Trantham | |
| 2009/0132620 A1 * | 5/2009 | Arakawa ................. | G06F 3/061 |
| 2011/0231597 A1 * | 9/2011 | Lai ....................... | G06F 12/0246 711/103 |
| 2018/0275899 A1 * | 9/2018 | Munsil .................. | G06F 3/0619 |

* cited by examiner

*Primary Examiner* — Zhuo H Li
(74) *Attorney, Agent, or Firm* — Hall Estill Attorneys at Law

(57) ABSTRACT

Method and apparatus for managing data such as in a flash memory. In some embodiments, a memory module electronics (MME) circuit writes groups of user data blocks to consecutive locations within a selected section of a non-volatile memory (NVM), and concurrently writes a directory map structure as a sequence of map entries distributed among the groups of user data blocks. Each map entry stores address information for the user data blocks in the associated group and a pointer to a subsequent map entry in the sequence. A control circuit accesses a first map entry in the sequence and uses the address information and pointer in the first map entry to locate the remaining map entries and the locations of the user data blocks in the respective groups. Lossless data compression may be applied to the groups prior to writing.

20 Claims, 6 Drawing Sheets

REVERSE MAP LOGGING IN PHYSICAL MEDIA

SUMMARY

Various embodiments of the present disclosure are generally directed to the management of data in a memory, such as but not limited to a flash memory.

In accordance with some embodiments, a memory module electronics (MME) circuit writes groups of user data blocks to consecutive locations within a selected section of a non-volatile memory (NVM), and concurrently writes a directory map structure as a sequence of map entries distributed among the groups of user data blocks. Each map entry stores address information for the user data blocks in the associated group and a pointer to a subsequent map entry in the sequence. A control circuit accesses a first map entry in the sequence and uses the address information and pointer in the first map entry to locate the remaining map entries and the locations of the user data blocks in the respective groups. Lossless data compression may be applied to the groups prior to writing.

These and other features which may characterize various embodiments can be understood in view of the following detailed discussion and the accompanying drawings.

DETAILED DESCRIPTION

Figure 1:
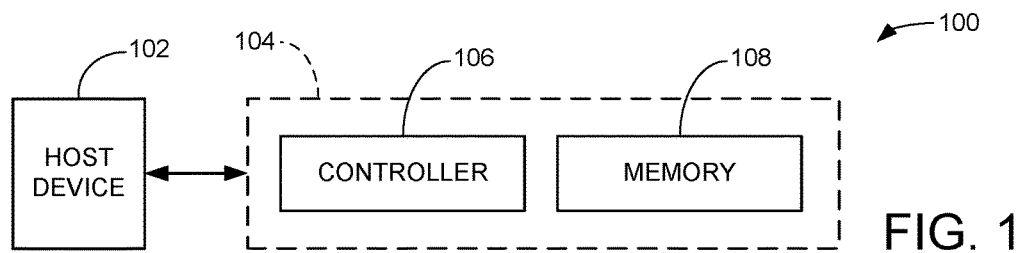
FIG. 1 provides a functional block representation of a data storage device in accordance with various embodiments.

The present disclosure generally relates to managing data stored in a non-volatile memory (NVM), such as but not limited to a flash memory of a solid state drive (SSD).

A wide variety of data storage memories are known in the art. Some memories are formed from solid-state memory cells which store data in relation to an amount of accumulated charge on a floating gate structure, such as with flash memory. An erasure operation is generally required before new data can be written to a given flash memory location.

Map structures are often used to track the physical locations of user data stored in a non-volatile memory (NVM) of a storage device to enable the device to locate and retrieve previously stored data. Such map structures may associate logical addresses for data blocks received from a host with physical addresses of the media, as well as other status information associated with the data.

The management of map structures can provide a processing bottleneck to a storage device controller in servicing access commands from a host device (e.g., read commands, write commands, status commands, etc.), as well as in performing internal housekeeping processes to relocate and recycle the memory (e.g., garbage collection operations, data promotion operations, etc.). Depending on granularity and workload, the map structures can be relatively large with many entries which are updated as new versions of data are written to new locations in the flash array. Additional processing resources are required to ensure that accurate copies of the map data are maintained in NVM, and that the needed map entries are efficiently and correctly retrieved for use.

Various embodiments of the present disclosure are generally directed to an apparatus and method for managing data in a memory, such as but not limited to a flash memory in a solid state drive (SSD). As explained below, some embodiments provide a controller circuit configured to communicate with a memory module. The memory module comprises a memory module electronics (MME) circuit and a non-volatile memory (NVM). The NVM is formed from a plurality of solid-state non-volatile memory cells, such as a flash memory array.

A primary map structure such as in the form of a forward table is maintained in memory by the controller circuit to associate logical addresses of user data blocks with physical addresses in the NVM. The primary map structure is loaded to local memory and used during normal data access operations to write data to and read data from the NVM.

A secondary, embedded map structure in the form of a distributed directory is written directly to the NVM in the vicinity of the associated data. The embedded map structure provides physical to logical translation on the media itself and is formed from a number of distributed reverse map entries. The embedded map structure is used during data recycling operations and may take the form of a reverse directory.

In some embodiments, a plurality of LBAs associated with a plurality of map units (MUs) are written to a selected region of the NVM, such as a flash page or a group of flash pages of memory. Each group of LBAs may be subjected to data compression prior to writing. In some embodiments, each group is immediately followed by a reverse map table which identifies the starting bit location of one, some or all of the LBAs associated with the group. In still further embodiments, the reverse map table contains a list of the LBAs corresponding to LBAs in the primary map structure written to the group of LBAs, without location data as the location data can be acquired from the primary map structure. The map table is made up of map entries, also referred to as map sub-tables, that may have one or more reverse pointers to point to the bit location of the previous reverse map entry or entries in the sequence. The first map entry (sub-table) in the sequence is written in a known, predetermined location.

During a recycling operation, the contents of the page or other section the NVM are retrieved and the first map entry is located by accessing the bits in the retrieved data that correspond to the predetermined location. From this, various reverse pointers can be used to discover the distributed table. There are some embodiments where the reverse map provides locations plus LBA locations and other embodiments where the reverse map only has LBAs and we use the primary ma the find the locations based on the LBAs.

This technique is particularly useful when processing such as data compression, encryption, variable code rates, etc. are applied to place the LBAs at unaligned boundaries within the associated page or other section of the NVM. This technique also eliminates the need to decode encrypted or compressed data before the boundaries of the LBAs can be identified, and provides redundancy in the event that the primary map structure becomes corrupted.

These and other features and advantages of various embodiments of the present disclosure can be understood beginning with a review of FIG. 1 which provides a functional block representation of a data processing system 100. The system includes a host device 102 and a data storage device 104. The data storage device 104 includes a controller circuit 106 and a memory module 108.

The controller circuit 106 is a programmable processor and/or hardware based circuit that provides top level communication and control functions for data transfers to and from non-volatile memory (NVM) storage in the memory module 108. The data transfers between the host device and the data storage device may be provided via a selected protocol.

Figure 2:
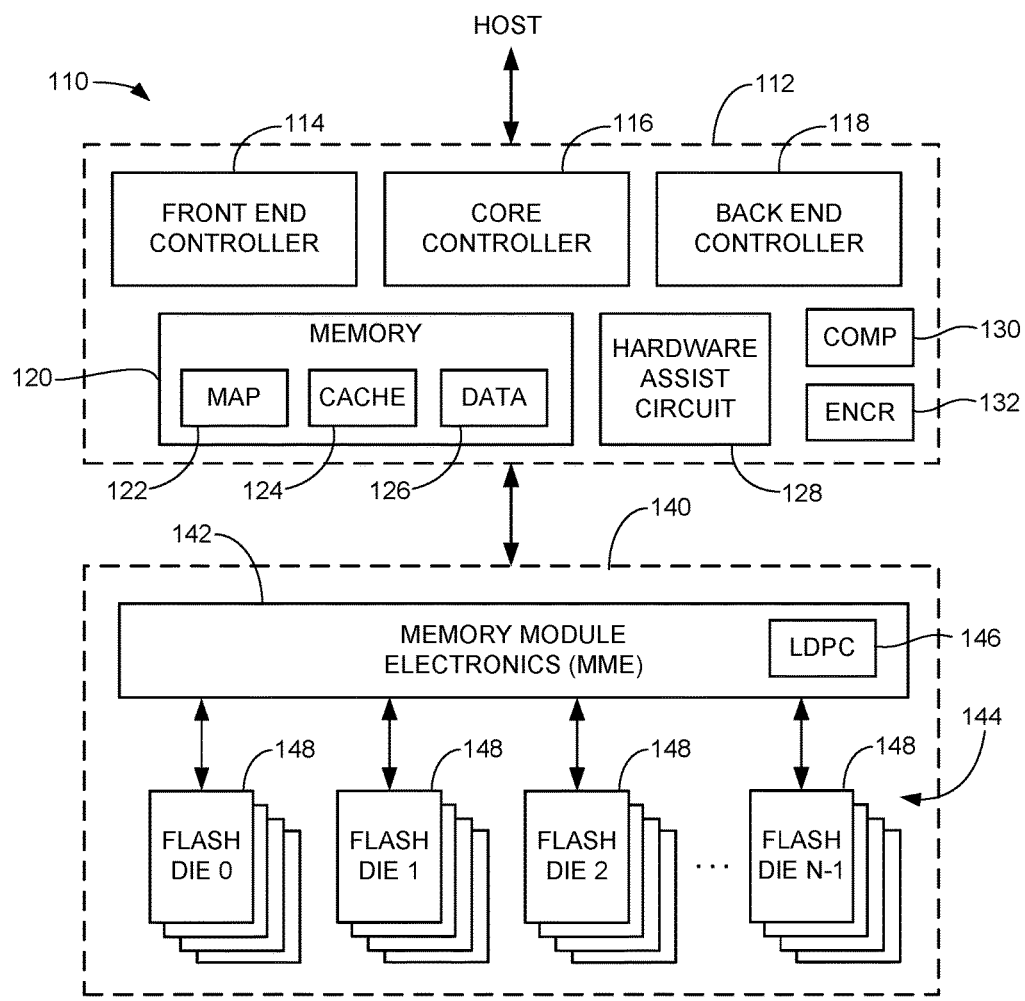
FIG. 2 shows aspects of the device of FIG. 1 characterized as a solid state drive (SSD) in accordance with some embodiments.

FIG. 2 shows a data storage device 110 generally corresponding to the device 104 in FIG. 1. The device 110 is configured as a solid state drive (SSD) that communicates with a host device such as 102 in FIG. 1 via one or more Peripheral Component Interface Express (PCIe) ports, although other configurations can be used.

The SSD 110 includes a controller circuit 112 and a memory module 114. The controller circuit 112 (hereinafter "controller") includes a front end controller 114, a core controller 116 and a back end controller 118. The front end controller 114 performs host I/F functions, the back end controller 118 directs data transfers with the memory module 114 and the core controller 116 provides top level control for the device.

Each controller 114, 116 and 118 includes a separate programmable processor with associated programming (e.g., firmware, FW) in a suitable memory location, as well as various hardware elements to execute data management and transfer functions. This is merely illustrative of one embodiment; in other embodiments, a single programmable processor (or less than three programmable processors) can be configured to carry out each of the front end, core and back end processes using associated FW in a suitable memory location. A pure hardware based controller configuration can also be used. The various controllers may be integrated into a single system on chip (SOC) integrated circuit device, or may be distributed among various discrete devices as required.

A controller memory 120 represents various forms of volatile and non-volatile memory (e.g., SRAM, DDR DRAM, flash, etc.) utilized as local memory by the controller 112. Various data structures and data sets may be stored by the memory including one or more map structures 122, one or more caches 124 for map data and other control information, and one or more data buffers 126 for the temporary storage of host (user) data during data transfers.

A non-processor based hardware assist circuit 128 may enable the offloading of certain memory management tasks by one or more of the controllers as required. The hardware circuit 118 does not utilize a programmable processor, but instead uses various forms of hardwired logic circuitry such as application specific integrated circuits (ASICs), gate logic circuits, field programmable gate arrays (FPGAs), etc.

Additional circuits that form the controller 112 may include a compression circuit 130 to perform data compression/decompression operations, and an encryption engine circuit 132 to perform various cryptographic functions such as encryption, decryption, hashes, signatures, etc. The compression and cryptographic functionality of these circuits may be realized in hardware and/or firmware, and may take various types as required.

FIG. 2 further shows a memory module 140 generally corresponding to the memory 104 in FIG. 1. The memory module 140 includes a memory module electronics circuit 142 (hereinafter "MME") and a flash memory array 144. The MME 142 includes read/write/erase (R/W/E) circuitry and other control circuitry incorporated into the memory module 140 to write data to the flash memory 144. The MME may be formed of one or more programmable processor circuits with associated programming in memory, and/or hardware circuits adapted to carry out various commands and data transfers with the controller 112. The MME circuit 142 may include additional circuitry such as an LDPC encoder/decoder circuit 146 to generate LDPC (low density parity check) codes which are useful to detect and correct bit errors in data during subsequent read operations. In other embodiments, such error correction decoding may take place by the controller (e.g., back end controller 118).

The flash memory 144 includes a plural number N flash dies 148 (referred to as die 0 to die N−1). Any number of dies can be used, such as sixteen dies (e.g., N=16, etc). The MME 142 can operate to carry out parallel data transfer operations along each of the channels (lanes) established with the associated dies 148. Multiple channels may be established with each die (e.g., at a plane level) as required,. The flash memory may be arranged as a single storage tier, or as multiple tiers.

While not limiting, it will be recognized by those skilled in the art that current generation SSDs and other data storage device systems can be formed from integrated memory modules such as 140 that are commercially available from a source of such devices. The memory modules may be integrated into an SSD by a device manufacturer which supplies the controller functions and tailors the controller to operate with the memory module. The controller and memory module are thus separate operational entities which communicate across one or more defined data and command interfaces. A "pull" system is commonly used in which the controller 112 issues commands and then repetitively checks (polls) the status of those commands by the memory module 140 to determine whether the commands have been completed.

Figure 3:
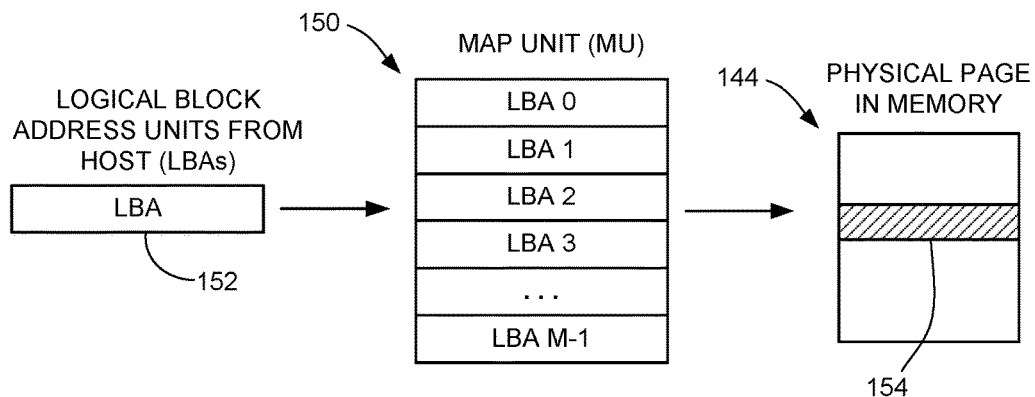
FIG. 3 illustrates a manner in which logical block address units (blocks or LBAs) are arranged into multi-block map units (MUs) for storage in the flash memory of FIG. 2 in some embodiments.

FIG. 3 shows an arrangement of a multi-block data structure referred to herein as a map unit (MU) 150. The map unit 150 represents a block of data of selected size formed from one or more input logical block address units 152 (LBAs) from the host 102. The LBAs 152 are logically referenced using a suitable host format (e.g., host LBA values, key-store values, virtual block addresses, etc.) and will generally have a fixed amount of user data. The MU 150 in turn forms a larger block of data. Data are written and read from the flash memory at the MU level (or greater). Exemplary sizes may be 512 bytes, B of user data in each of the LBAs 152 and 4 KB (4096B) of user data in each MU 150, although other respective values may be used.

Depending on size, one or more MUs 150 are arranged for storage in a page 154 of the flash memory 144. The flash dies 148 are arranged into garbage collection units (GCUs) of erasure blocks that span multiple dies. Erasure blocks represent the smallest increment of the flash memory that can be erased at one time. Each page represents a row of memory cells in a given erasure block that all share a common control line (e.g., word line) and thus represents the smallest increment of data that can be written or read at a time. Multiple pages of data can be written to the same row of memory cells using multi-level cell (MLC), three-level cell (TLC), four-level cell (FLC) techniques, etc. The page size can vary but common values include 8 KB, 16 KB, etc.

Figure 4:
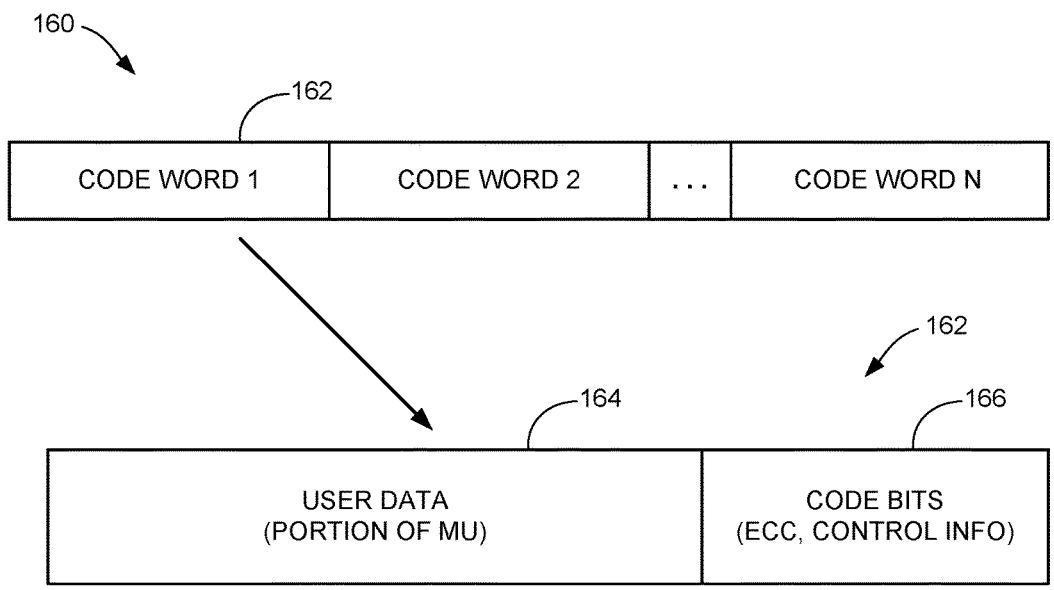
FIG. 4 shows an arrangement of a page of memory in the flash array as an integer number of code words.

FIG. 4 shows an arrangement of code words 160 that are written to each page 154. Generally, each page 154 is divided up into an integer number N of code words 160, where N is any suitable plural number. N may be divisible by 2, but such is not required. Each code word includes a user data portion 164 and a code bits portion 166. The user data portion 164 constitutes bits from the user data portion of the MU 150 (FIG. 3) as well as other associated information (e.g., IOEDC values, etc.). The code bits 166 constitute control data and may include error correction codes (ECC), status information, etc. The ECC codes can take a variety of forms including Reed Solomon (RS) codes, LDPC (low density parity check) codes, BCH (Bose-Chaudhuri-Hocquenghem) codes. parity codes, etc.

Figure 5:
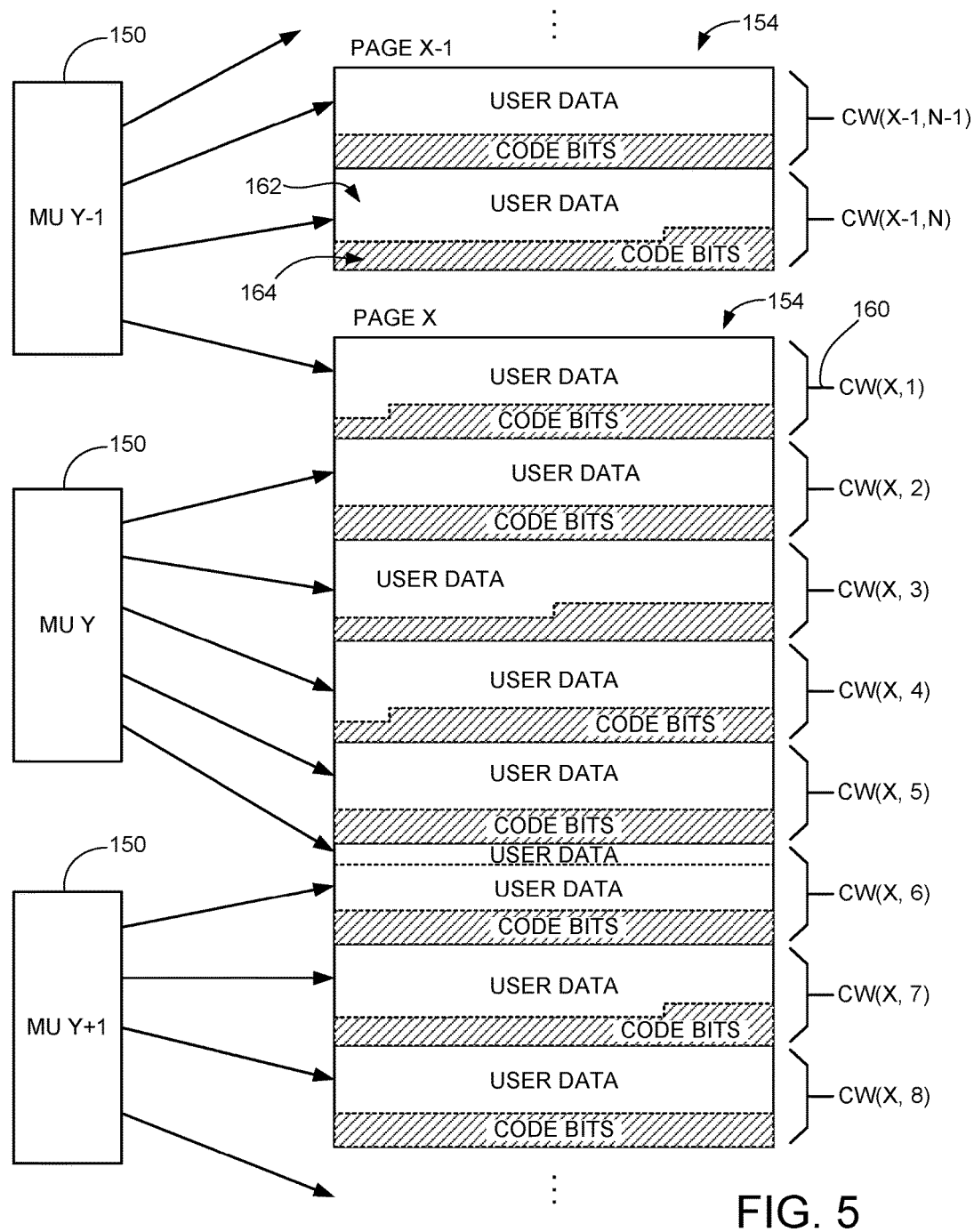
FIG. 5 is a mapping diagram to illustrate how various map units are distributed across adjacent code words across adjacent pages in some embodiments.

FIG. 5 illustrates the general manner in which various MUs 150 from FIG. 3 may be written to adjacent code words 160 in adjacent pages 154 of the flash memory 144 in some embodiments. It will be understood that FIG. 5 is conceptual in nature, so the actual ratio of MUs to code words may vary significantly depending on a variety of factors and may be different from that shown in FIG. 5. For example, in one implementation a typical code word may have a size on the order of about 2 KB while an uncompressed MU may be on the order of about 4 KB, so even an uncompressed MU may only span 3-4 code words. If MUs are significantly compressed, the sizes may be as little as 1K-2K or so, allowing in some cases for multiple MUs to be stored in a single code word.

Headers may be generated by the MME and inserted at the beginning of every code word, but such are omitted for clarity. The headers may list the LBAs stored in the associated MU area. In some cases, MUA (map unit addresses) may be used to define a plurality of LBAs associated with an MU and match the base LBA address stored in both the primary mapping table (forward table) and the reverse directory stored to the media.

FIG. 5 shows portions of two successive pages denoted as page X−1 and page X. It is contemplated that the respective pages X−1 and X are physically sequential in the flash memory, such as on adjacent word lines or different bit levels (e.g. MSB, LSB) of multi-level cells along a common word line. In other embodiments, the pages X−1 and X are disposed on successive dies 148 (FIG. 2) in a selected GCU.

The last two code words 160 in page X−1 are denoted as CW (X−1, N−1) and CW (X−1, N). The first eight (8) code words 160 of Page X are denoted as CW (X, 1) through CW (X, 8). The blank portions of each code word represent the user data portions 162 and the hashed portions of each code word represent the code bit portions 164 (see FIG. 4).

Three successive map units 150 are written to the various code words. The map units are denoted as MU Y−1, MU Y and MU Y+1.

The user data portions 162 of the code words 160 are supplied by the controller 112. At least portions of the code bits in the portions 164 may be generated by the MME 142 (FIG. 2) based on a selected code rate and other factors. If the LDPC decoding from LDPC circuit 146 is carried out at the MME level, then the data returned to the controller 112 by the MME 142 is stripped of the code bits and constitutes the previously submitted MU data (user data plus embedded ECC data, etc.) after successful decoding of the data.

It follows that the various MUs 150 may be distributed across multiple adjacent code words 160, and in some cases, may span multiple adjacent pages 154. This is particularly true if the MUs are subjected to lossless compression by the compression circuit 130, since depending on the compression rate and code rate, boundaries between MUs may not fall at code word boundaries. To illustrate this, code word CW (X, 6) is shown to include the last part of the user data from MU Y and beginning portions of the user data from MU Y+1.

Figure 6:
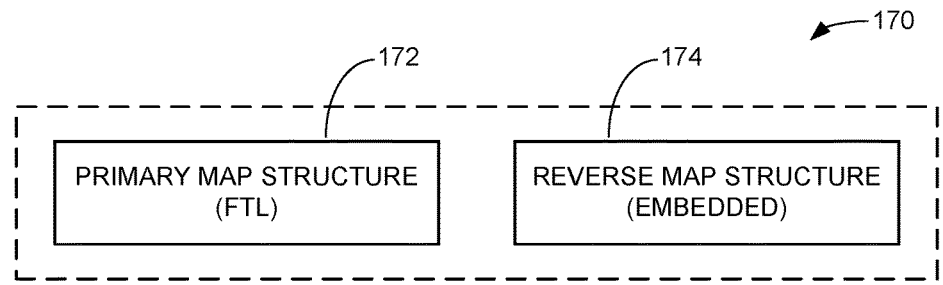
FIG. 6 represents map data structures utilized by the SSD in some embodiments to access the data shown in FIG. 5.

FIG. 6 is a high-level representation of system map data 170 used by the SSD 110 to track the locations of the data written to the flash array 144. Other arrangements can be used. The map data 170 includes a primary (forward) map structure 172 and a secondary (reverse) map structure 174. While not limiting, it is contemplated that the primary map structure 172 is utilized during normal data access operations (e.g., host reads and writes, etc.), and the secondary map structure 174 is used during background processing (e.g., garbage collection operations, etc.). In further embodiments, a combination of the primary map data 172 and the secondary map data 174 are used during background processing (e.g., garbage collection operations). The primary map structure 172 may be a single level map or a multi-level map, and provides a flash transition layer (FTL) mechanism to correlate logical addresses of the data with physical addresses in the flash. To retrieve a selected LBA, the retrieval sequence includes accessing the primary map structure 172 to determine that the selected LBA is resident in MU Y (see FIG. 5), determining the location of MU Y from the primary map structure as being within Page X, reading and processing the entire contents of Page X, identifying the code words in Page X that store portions of MU Y (in this case, code words CW (X, 2) through CW (X, 6)), followed by segregating out the data for MU Y and locating the individual data bits for the selected LBA. The decoding of the selected LBA may include data decompression, decryption, error correction, etc. Once resolved, the selected LBA can be transferred to a requesting host device (e.g., host 102 in FIG. 1).

The reverse map structure 174 in FIG. 6, also referred to as a distributed or reverse directory, is an embedded map structure that is physically written to the flash adjacent the associated data as a sequence of map entries adjacent groups of LBAs.

Figure 7:
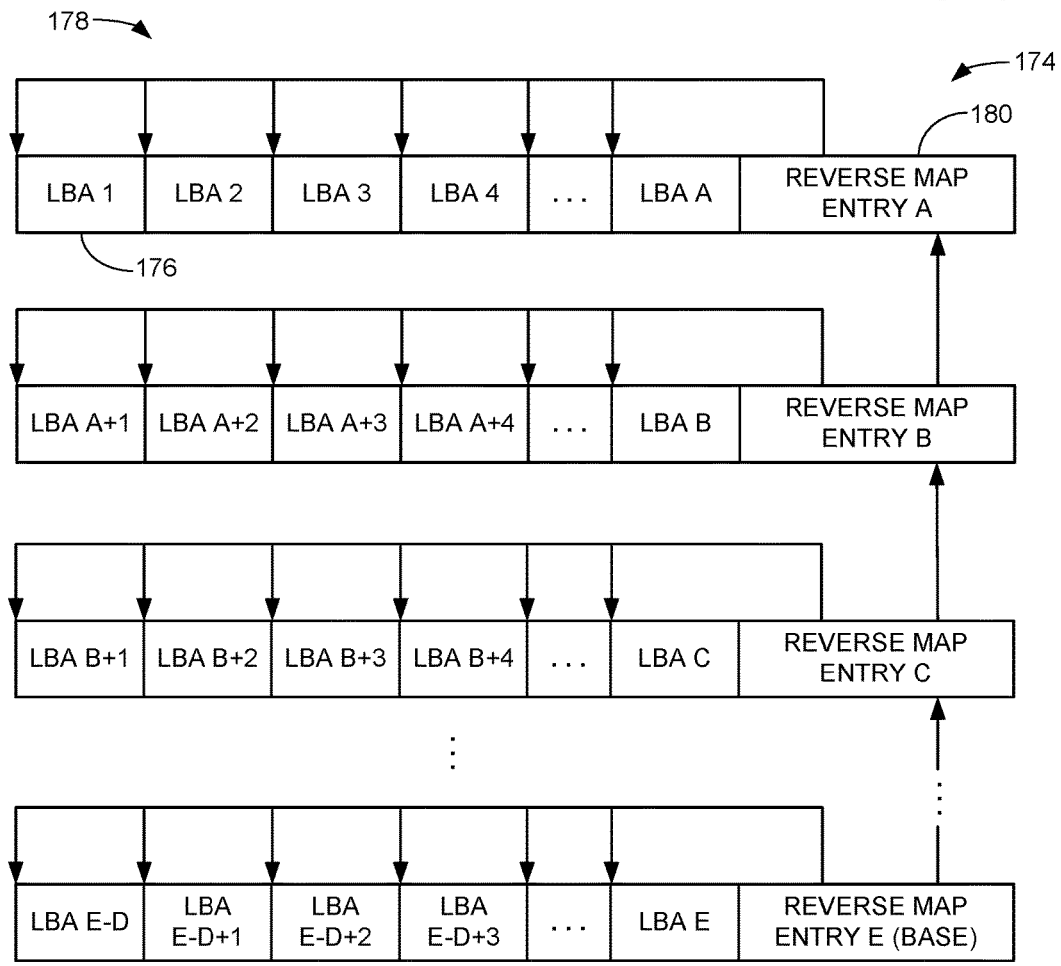
FIG. 7 shows map entries of the embedded reverse map data structure of FIG. 6 in accordance with some embodiments.

FIG. 7 shows the reverse map structure 174 in greater detail for a section of the NVM (flash memory). LBAs sequentially written to the user data portions 162 of a page are individually denoted at 176. The LBAs 176 are arranged into groups 178, each group comprising a set of consecutive LBAs that are written to adjacent solid-state memory cells along a given word line in the flash memory. The first group 178 comprises a total number A LBAs, the second group represents the next total number B LBAs, and so on. Each group may have the same number of LBAs, or may constitute different numbers of LBAs. Any suitable number of LBAs can be used in each group.

It is contemplated that, in most cases, the LBAs 176 in each group 178 will be immediately adjacent one another in a physical context. However, at least some of the groups 178 may span from one code word 160 to the next (see FIG. 5), so that a block of code bits 164 is interjected within a medial portion of such groups. It is contemplated that the various groups in a given set will be contained within a single page 154, for reasons discussed below. This is not necessarily required, however, as the map structure 174 can span multiple pages, dies, etc. as well as describe less than an entire page 154, as desired.

The LBAs 176 in each group 178 may be written sequentially in logical order to the flash media to simplify data management, particularly at the primary map level (map structure 172). Such is not necessarily required since the reverse map structure 174 can operate equally well with randomly arranged writes of the LBAs. It is contemplated, albeit not necessarily required, that the LBAs in each group are subjected to lossless compression (e.g., expressed as a sequence of literals and index values to reduce the bit count) to reduce the overall data footprint and enhance data capacity. The LBAs 176 may be subjected to other processing as well, such as encryption. The significance of data compression is that, depending on the compression rate, LBA boundaries may be random and not easily determined prior to decompression of the data. The significance of encryption is that embedded control data (such as headers, IOEDC values, etc.) may not be immediately discoverable without a decryption operation.

The reverse map structure 174 is formed as a sequence of map entries 180, identified as map entries A-E in sequential order. Map entry E is referred to as a base, or first, map entry and is written to a predetermined location (address) in the page 154. This allows the base reverse map entry to be easily identified. Each reverse map entry 180 describes the addresses of the LBAs 176 in the associated group 178, and has a reverse pointer that indicates the bit location of the preceding map entry in the sequence. Base entry E points to each of the LBAs in the associated group (e.g., LBAs E-D to LBA E) as well as to the preceding map entry C in the sequence. This continues from map entry C to map entry B, and from map entry B to map entry A. Map entry A has a null value as its reverse map entry pointer to indicate that map entry A is the last map entry in the sequence.

Other arrangements can be used so the foregoing is merely illustrative and not limiting. For example, LBA address pointers may be omitted and instead point to headers or other information to identify the LBAs in a selected group, and primary map data (forward table) may be used to identify the LBAs. Similarly, the map entries (sub-tables) may include multiple pointers to multiple other map entries, some may not include a map pointer value, etc. The reverse pointers could optionally be cumulative. For example, the first reverse map portion could have no reverse pointer, the second could have one reverse pointer, the third could have two reverse pointers, and so on. This is not necessarily required, but could be more efficient in some cases. Basically, a reverse map section is provided with a plurality of reverse map pointers to previous entries. This can be implemented in a variety of ways.

Figure 8:
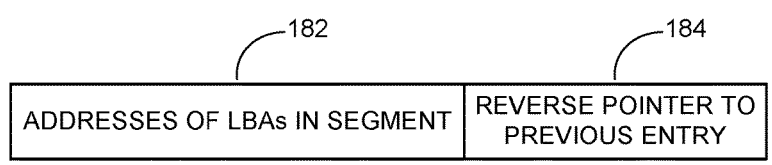
FIG. 8 shows an example format for each of the map entries of FIG. 7.

FIG. 8 provides an example format for each of the map entries. An LBA address field 182 provides the pointers to the LBAs in the associated group, and a map entry pointer field 184 provides the pointer to the previous map entry. It is contemplated albeit not necessarily required that each map entry will have the same bit length to simplify the location of the map entry and LBA boundaries among the retrieved bit sequence.

Figure 9:
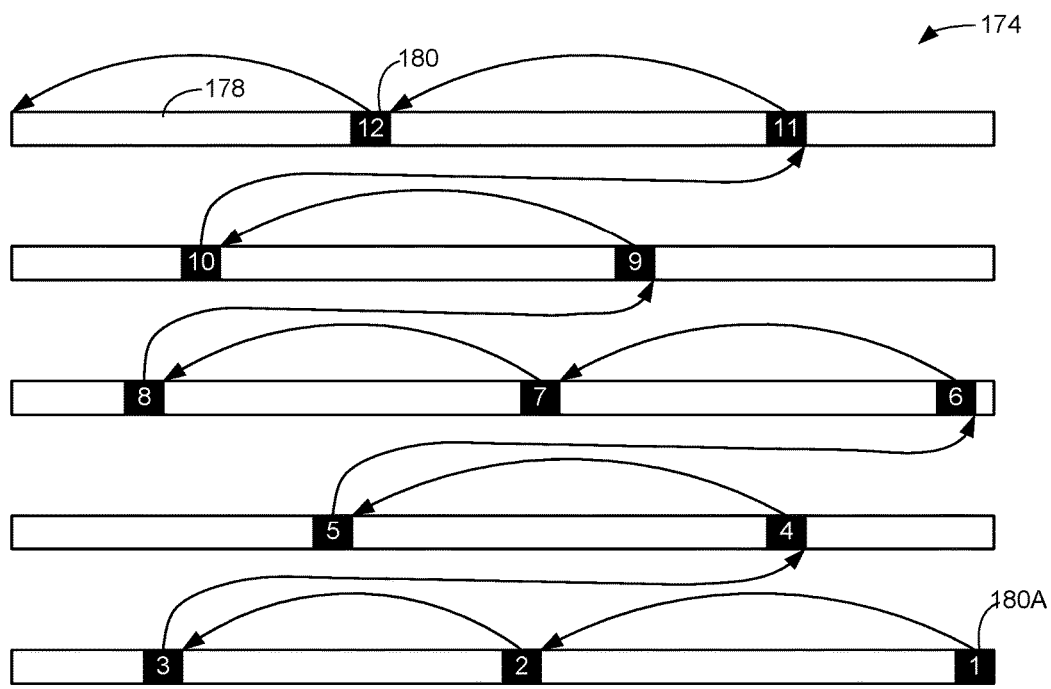
FIG. 9 is a schematic representation of a search strategy used to locate each of the map entries in a selected section of the NVM in some embodiments.

FIG. 9 shows a reverse (backwards) search strategy. A base reverse map entry 180A (denoted as map entry 1) is initially located, followed by using the reverse pointers to locate each of the preceding map entries in the sequence up to the final map entry (map entry 12). It will be noted that the search strategy includes having a plurality of reverse pointers.

Writing and searching the map entries 180 in reverse order, as shown in FIG. 9, provides certain operational advantages. The output of the compression engine will provide blocks of compressed data in each group 178, and the associated map entry 180 can be immediately generated and inserted into the bit sequence to point to the beginning of one or more of the LBAs in the preceding group. Placing the base entry 180A at the end of the sequence further enables the base entry to be written at a convenient location (such as the last bits in a given bit sequence). Other arrangements can be used.

Referring again to FIG. 8, the map entries 180 can incorporate additional information as desired, such as the total number of entries in the directory chain, whether code bits or other information splits a given group, etc. While it is contemplated that all of the entries in a given chain will describe sequentially arranged data groups in the NVM, the entries can jump to other locations (e.g., separate dies within a selected GCU, different pages on the same or different die, etc.) as required.

The reverse map entry boundaries can be written at MU boundaries, or can span multiple MUs. The group size can be any suitable number of LBAs. In some cases, a predetermined number of reverse map entries 180 (such as 12 entries) is selected on a per page (or section) basis, and the LBAs written to that page (or section) are divided accordingly so that each map entry more or less describes a common subset of the LBAs written to that page or section.

Figure 10:
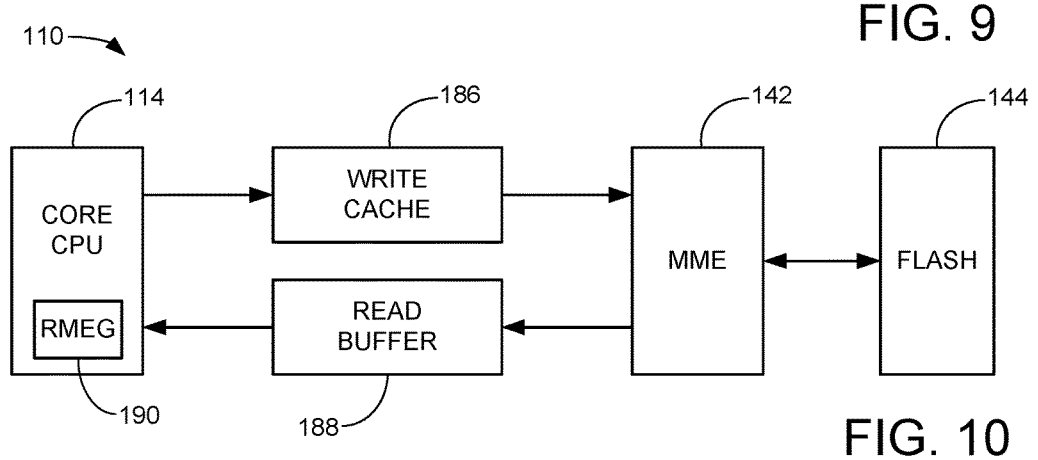
FIG. 10 is a functional block representation of further aspects of the SSD.

FIG. 10 is a functional block representation of further aspects of the SSD 110 in some embodiments. The core CPU 116 operates using a non-volatile write cache 186 and a volatile read buffer 188 to transfer data with the MME 142. MUs are assembled and placed into the write cache pending writing to the flash memory 144 during the servicing of a write command from the host. During the servicing of a subsequent read command from the host, the MUs are retrieved, disassembled and placed into LBA format in the read buffer for transfer to the host device 102. To retrieve a given MU, the controller locates and reads the associated forward table entry in the primary map structure 172 (FIG. 6) request the associated page (or code words), and from that the controller processes the requested LBAs for return to the requesting host.

FIG. 10 further shows a reverse map entry generator (RMEG) circuit 190. The RMEG circuit 190 operates during the formation of the MUs 150 to generate and insert the various map entries 180 into the MU. When directing the writing of the MUs, the controller can instruct the base MU to be written at a predetermined location.

Figures 11, 12:
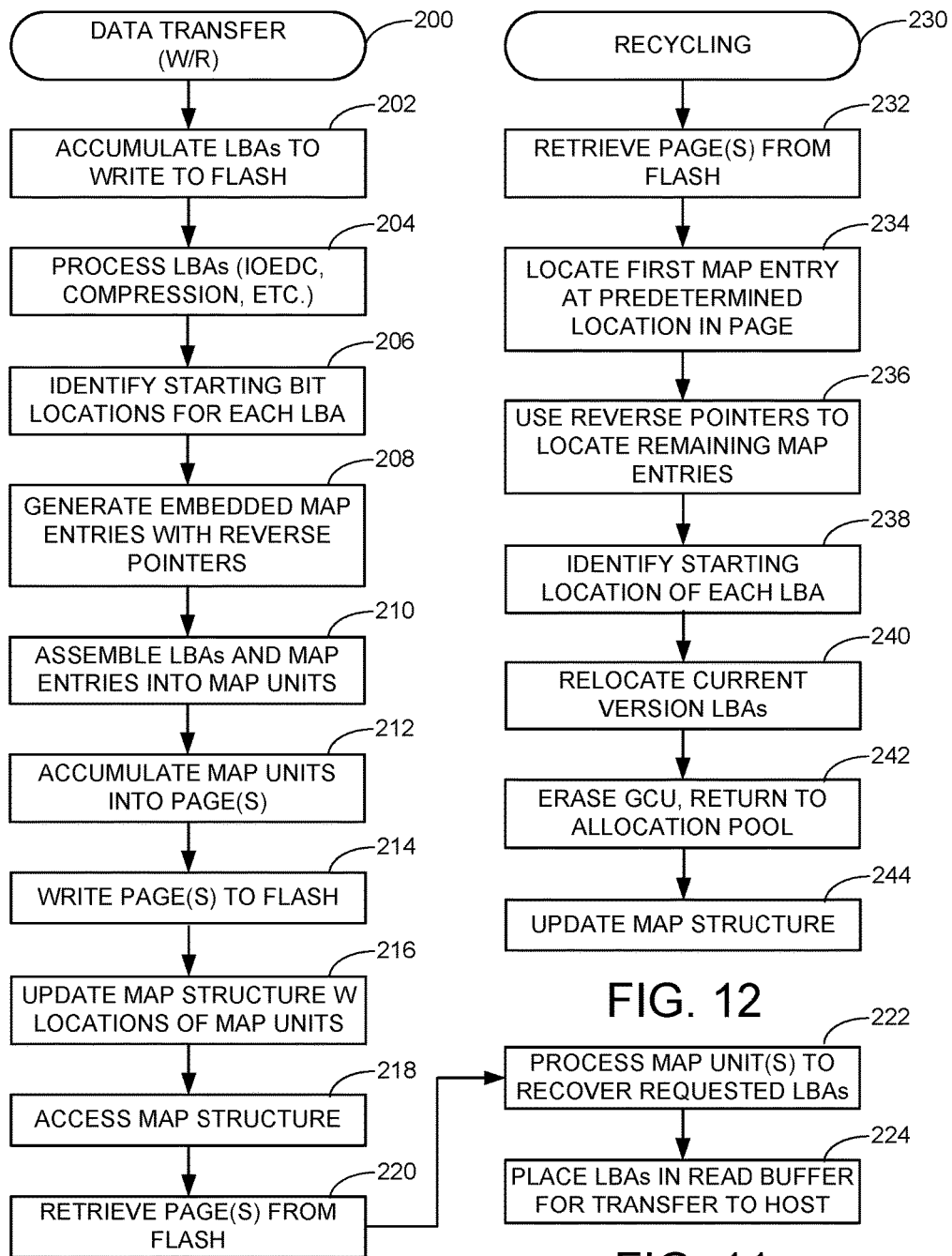
FIG. 11 is a flow chart for a data transfer (R/W) routine illustrative of steps carried out by the SSD in accordance with some embodiments to perform data transfer operations with the flash memory.
FIG. 12 is a flow chart for a recycling routine illustrative of steps carried out by the SSD in accordance with some embodiments to perform data recycling operations with the flash memory.

FIG. 11 is a flow chart to illustrate a data transfer (R/W) routine 200 carried out by the SSD 110 using the map structure 170 of FIG. 6. The steps are merely illustrative and are not limiting, and may represent programming executed by one or more processors/hardware circuits of the SSD to write user data to and read user data from the flash memory 144.

At step 202, a data write operation is serviced responsive to a data write command from the host. The write command will include the associated LBAs to be written to flash. The controller 112 accumulates the various LBAs into one or more MUs in the write buffer. As noted above, it is contemplated that the LBAs will be arranged in a logical sequential order, although such is not necessarily required. In some cases, the data may be received in one logical order and the controller will rearrange the data to place the data, in the MUs, in a different logical (sequential) order.

At step 204, the SSD proceeds accumulate sufficient MUs to fill one or more pages of data. The data are thereafter supplied to the MME 142 which operates to encode the data into code words and write the code words to the flash memory, step 206. The map structure 170 is thereafter updated as arranged in FIG. 6 to indicate the various information therein (e.g., MU addressing, offset and length, etc.). As an aside, the map structure may be maintained/loaded in local volatile memory to enable write-in-place updates, with background copying and journaling operations taking place on a regular basis to maintain one or more updated maps stored in NVM. While not necessary, the controller can operate during this process to accumulate the previous reverse map pointers.

A subsequent read operation is serviced responsive to a data read command from the host. The read command may be formatted as a request for a selected range of LBAs to be retrieved from the flash memory. At step 212, the controller 112 accesses the associated entries for the map structure 170 associated with the MU(s) that include the requested data. This includes identification of the physical page address (PBA) of the page or pages to be retrieved, as well as the various MU offset(s) and length(s). The command is forwarded to the MME 142 which retrieves the requested page(s) from flash at step 214.

The received data blocks are processed by the controller using the data from the map structure (rather than from the embedded header information) at step 216, and the data are arranged in the read buffer for subsequent transfer to the requesting host at step 218.

FIG. 12 is a recycling routine 220 to show further aspects of various embodiments in accordance with the foregoing discussion. As noted above, the routine may be carried out during background processing such as garbage collection operations to copy valid data, erase garbage collection units (GCUs) and return such to an allocation pool for subsequent allocation.

At step 222, one or more pages of data are retrieved from flash memory. The header information from the headers 166 (FIG. 7) is accessed to locate each of the MUs stored in the associated pages, step 224. From this, current version data blocks that need to be retained can be identified by the controller at step 226. The data are rearranged and rewritten to new locations, step 228, after which the MME 142 operates to erase the GCU and return the GCU to an allocation pool pending subsequent allocation for the storage of new data. As required, the map structure is updated to reflect the new locations of the relocated data, step 232.

In this way, the SSD 110 can be viewed as including a memory module (such as 140) comprising a non-volatile memory (NVM) (flash 144) and a memory module electronics (MME) circuit (such as 142) configured to program data to and read data from solid-state non-volatile memory cells of the NVM.

A map structure (such as table 170, FIG. 6) is stored in a memory (such as memory 120, FIG. 2). The map structure associates logical addresses of user data blocks with physical addresses in the NVM at which the user data blocks are stored (see e.g., columns 172, 174). A controller circuit (such as 112, FIG. 2) is configured to arrange the user data blocks into map units (MUs) (such as 150, FIG. 3). Each MU has multiple user data blocks (such as LBAs 152) arranged with the associated logical addresses in sequential order (see e.g., FIG. 3).

The controller circuit is configured to direct the MME circuit to write a plurality of the MUs to a selected page (such as 154) of the NVM arranged as an integer number of code words (such as 160; see FIGS. 4-5). The controller circuit is further configured to update the map structure to list only a single occurrence of a physical address for all of the MUs written to the selected page (see e.g., FIG. 6, column 174), and to list an MU offset and an MU length for all of the multiple user data blocks in each of the MUs written to the selected page (FIG. 6, columns 176, 178).

It will now be appreciated that the various embodiments presented herein can provide a number of advantages. Map compression enables a smaller, more efficient footprint for the map structure 170, as well as providing common data for the various MUs that are stored in a given page. By eliminating the need to read the header information stored to the media in order to locate the various MUs, processing steps such as extra reads, data decompression, decryption, etc. can be avoided. Since the header information that is stored to the media is not accessed during normal operations (but is during recycling), the headers can be placed in a more convenient location, such as a page or MU boundary, or at a predetermined location within the page (e.g., page X, offset Y, etc.).

While various embodiments have been described in the environment of a flash memory, such is merely illustrative. The various embodiments can be readily implemented into other forms of solid-state memory including but not limited to spin-torque transfer random access memory (STRAM), resistive random access memory (RRAM), phase change random access memory (PCRAM), magnetic random access memory (MRAM), etc.

It is to be understood that even though numerous characteristics and advantages of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. An apparatus comprising:
  a non-volatile memory (NVM) comprising solid-state memory cells arranged to store user data blocks from a host device;
  a memory module electronics (MME) circuit configured to write groups of user data blocks to consecutive locations within a selected section of the NVM and to concurrently write a directory map structure to the selected section of the NVM comprising a sequence of map entries distributed among the groups of user data blocks, the map entries storing address information associated with the groups of user data blocks and a plurality of pointers that identify address information associated with other map entries in the sequence; and
  a control circuit configured to locate a selected one of the user data blocks by accessing a first map entry in the sequence, using the pointers in the first map entry and in the remaining map entries to successively locate each of the map entries in turn, to use the address information in the associated map entry to locate the selected one of the user data blocks.

2. The apparatus of claim 1, wherein the first map entry in the sequence is written at a predetermined location within the selected section of the NVM, wherein the control circuit accesses the first map entry responsive to the predetermined location and locates a second map entry in the sequence responsive to the pointer in the first map entry, and wherein the address information stored in the first map entry describes the corresponding group of user data blocks disposed between the first and second map entries in the selected section of the NVM.

3. The apparatus of claim 1, wherein the control circuit directs the MME circuit to transfer a copy of the groups of user data blocks and the sequence of map entries to a local memory as a bit sequence, searches the bit sequence to locate the first map entry responsive to a predetermined location at which the first map entry is stored in the NVM, and to use the pointer and address information in the first map entry to locate corresponding bits in the bit sequence that represent the remaining map entries and groups of user data blocks.

4. The apparatus of claim 1, wherein the section of the NVM comprises a page of memory in a flash memory array.

5. The apparatus of claim 1, wherein the groups of user data blocks each comprise the same total number of user data blocks.

6. The apparatus of claim 1, wherein the control circuit is further configured to apply lossless data compression to the groups of data blocks prior to writing thereof to the section of the NVM.

7. The apparatus of claim 5, wherein the control circuit further comprises a reverse map entry generator circuit which generates each map entry in turn as each group of user data blocks is compressed using the lossless data compression.

8. The apparatus of claim 1, wherein each of the groups of user data blocks is written to a different consecutive number of immediately adjacent flash memory cells, and each of the corresponding map entries is written to a second different consecutive number of immediately adjacent flash memory cells following the associated group.

9. The apparatus of claim 1, wherein the controller circuit comprises a programmable processor having associated program instructions stored in a local memory executed by the programmable processor to arrange the groups of user data blocks and map entries in sequential order for writing by the MME circuit.

10. A solid state drive (SSD), comprising:
a non-volatile memory (NVM) comprising solid-state flash memory cells arranged into pages to store user data blocks from a host device;
a memory module electronics (MME) circuit configured to write groups of user data blocks to consecutive locations within a selected page and to embed map entries of a distributed directory map structure to the selected page among the groups of user data blocks, the map entries sequentially arranged from a first map entry to a last map entry, each map entry storing address information associated with a corresponding one of the groups of user data blocks and a pointer that identifies address information associated with an immediately successive map entry in the sequence, the first map entry stored at a predetermined location within the selected page; and
a control circuit configured to locate at least a selected one of the user data blocks by accessing the first map entry responsive to the predetermined location, using the pointers in the first map entry and in the remaining map entries to successively access each of the map entries in turn, to use the address information in the associated map entry to locate the selected one of the user data blocks, and to direct a transfer the at least a selected one of the user data blocks to a host device responsive to a read request from the host device for the at least a selected one of the user data blocks.

11. The SSD of claim 10, wherein the control circuit further comprises a compression circuit configured to apply lossless data compression to each of the user data blocks in each group in turn, and a reverse directory map generator circuit configured to generate a corresponding map entry responsive to the lossless data compression for each group.

12. The SSD of claim 10, further comprising a read buffer memory, wherein the control circuit is further configured to direct the MME circuit to transfer a copy of the groups of user data blocks and the sequence of map entries to a local memory as a bit sequence, search the bit sequence to locate the first map entry responsive to the predetermined location at which the first map entry is stored in the NVM, and to use the pointer and address information in the first map entry to locate corresponding bits in the bit sequence that represent the remaining map entries and groups of user data blocks.

13. The SSD of claim 10, wherein the pointer of the last map entry in the sequence has a null value to indicate the last map entry is the final map entry in the sequence.

14. A method comprising:
writing groups of user data blocks to each of a number of consecutive locations within a selected section of a non-volatile memory (NVM) comprising solid-state memory cells;
concurrently writing a distributed directory map structure to the selected section of the NVM comprising a sequence of map entries distributed between the groups of user data blocks, each map entry in the sequence storing address information associated with a corresponding one of the groups of user data blocks and a pointer that identifies address information associated with an immediately successive map entry in the sequence, the map entries in a sequential order from a first map entry to a last map entry, the first map entry written at a predetermined location within the selected section of the NVM; and
retrieving at least a subset of the user data blocks stored in the selected section of the NVM by accessing the first map entry in the sequence, using the pointers in the first map entry and in the remaining map entries to successively locate each of the map entries in turn, and using the address information in the associated map entry to locate and decode the at least a subset of the user data blocks.

15. The method of claim 14, further comprising applying lossless data compression to each of the groups of user data blocks prior to the writing thereof to the selected section of the NVM, and subsequently applying lossless data decompression to the at least a subset of the user data blocks.

16. The method of claim 14, wherein each map entry immediately follows the corresponding group of user data blocks in the selected section, and the map entries are written in reverse order so that the first map entry is written to the predetermined location after the groups of user data blocks and the remaining map entries are written.

17. The method of claim 14, wherein a control circuit accesses the first map entry responsive to the predetermined location and locates a second map entry in the sequence responsive to the pointer in the first map entry, and wherein the address information stored in the first map entry describes the corresponding group of user data blocks disposed between the first and second map entries in the selected section of the NVM.

18. The method of claim 14, wherein the retrieving step comprises transferring a copy of the groups of user data blocks and the sequence of map entries to a local memory as a bit sequence, searching the bit sequence to locate the first map entry responsive to the predetermined location at which the first map entry is stored in the NVM, and using the pointer and address information in the first map entry to locate corresponding bits in the bit sequence that represent the remaining map entries and groups of user data blocks.

19. The method of claim 14, wherein the section of the NVM comprises a page of memory in a flash memory array.

20. The apparatus of claim 1, wherein each of the groups of user data blocks each comprise the same total number of user data blocks and occupy a different total number of bits in the selected section of the NVM responsive to application of lossless data compression prior to the writing of the groups of user data blocks.

* * * * *